United States Patent
Zheng et al.

(10) Patent No.: US 11,421,078 B2
(45) Date of Patent: Aug. 23, 2022

(54) PREPARATION METHOD FOR CORNCOB-SHAPED HNT-PANI/PP

(71) Applicant: FUZHOU UNIVERSITY, Fujian (CN)

(72) Inventors: Yuying Zheng, Fuzhou (CN); Yijun Su, Fujian (CN)

(73) Assignee: FUZHOU UNIVERSITY, Fuzhou (CN)

( * ) Notice: Subject to any disclaimer, the term of this patent is extended or adjusted under 35 U.S.C. 154(b) by 661 days.

(21) Appl. No.: 16/467,955

(22) PCT Filed: Sep. 29, 2018

(86) PCT No.: PCT/CN2018/108606
§ 371 (c)(1),
(2) Date: Jun. 8, 2019

(87) PCT Pub. No.: WO2019/140951
PCT Pub. Date: Jul. 25, 2019

(65) Prior Publication Data
US 2021/0340323 A1    Nov. 4, 2021

(30) Foreign Application Priority Data
Jan. 19, 2018    (CN) .......................... 201810053992.2

(51) Int. Cl.
| | | |
|---|---|---|
| *C08G 73/02* | (2006.01) | |
| *B29B 9/10* | (2006.01) | |
| *B29C 45/77* | (2006.01) | |
| *B29C 45/78* | (2006.01) | |
| *C08K 3/34* | (2006.01) | |
| *C08L 23/12* | (2006.01) | |
| *B82Y 40/00* | (2011.01) | |

(52) U.S. Cl.
CPC ............ *C08G 73/0266* (2013.01); *B29B 9/10* (2013.01); *B29C 45/77* (2013.01); *B29C 45/78* (2013.01); *C08K 3/346* (2013.01); *C08L 23/12* (2013.01); *B82Y 40/00* (2013.01); *C01P 2004/13* (2013.01); *C01P 2004/64* (2013.01); *C08K 2201/001* (2013.01); *C08K 2201/011* (2013.01); *C08K 2201/017* (2013.01); *C08L 2201/04* (2013.01)

(58) Field of Classification Search
CPC ............ C01P 2004/13; C01P 2004/133; C01P 2004/136; C01P 2004/16; C01P 2004/17; C01P 2004/20; C01P 2004/22; C01P 2004/24; C01P 2004/30; C01P 2004/32; C01P 2004/34; C01P 2004/36; C01P 2004/38; C01P 2004/39; C01P 2004/40; C01P 2004/41; C01P 2004/42; C01P 2004/45; C01P 2004/90; B29B 9/10; B29B 9/12; B82Y 40/00; C08K 3/34; C08K 3/346; C08K 3/36; C08K 2201/001; C08K 2201/011; C08K 2201/017; C08L 23/10; C08L 23/14; C08L 23/142; C08L 23/145; C08L 23/147; C08L 23/16; C08L 23/18; C08G 73/0266

See application file for complete search history.

(56) References Cited

FOREIGN PATENT DOCUMENTS

| | | | |
|---|---|---|---|
| CN | 103881378 A | 6/2014 | |
| CN | 104558848 A * | 4/2015 | ............ B29C 48/92 |
| CN | 104558848 A | 4/2015 | |
| CN | 108264686 A | 7/2018 | |
| JP | 2014074098 A | 4/2014 | |

OTHER PUBLICATIONS

CN104558848A English Machine Translation, prepared Mar. 11, 2022. (Year: 2022).*
Zhang, L., et al., "Polyaniline coated halloysite nanotubes via in-situ polymerization", Applied Surface Science, 255, pp. 2091-2097, Jul. 5, 2008. (Year: 2008).*

* cited by examiner

*Primary Examiner* — Christopher M Rodd

(57) ABSTRACT

Disclosed is a preparation method for corncob-shaped HNT-PANI/PP, specifically comprising: polymerizing aniline in situ on cleaned HNTs in an ice-water bath; mixing corncob-shaped HNT-PANI composite powder obtained by vacuum drying and PP plastic in a high-speed mixer in a certain ratio, performing extrusion granulation by using a twin-screw extruder, and performing injection molding by using an injection molding machine to prepare standard sample strips of an HNT-PANI/PP composite material. The corncob-shaped HNT-PANI composite material prepared according to the present invention has excellent electrical conductivity, thermal conductivity and flame retardance, the mechanical properties of the composite material can be improved, electrical and flame-retardant properties of PP engineering materials can be improved, and thus the application field of PP is greatly broadened.

7 Claims, 2 Drawing Sheets

PREPARATION METHOD FOR CORNCOB-SHAPED HNT-PANI/PP

FIELD AND BACKGROUND OF THE INVENTION

This present invention belongs to the technical field of preparation of polymer composite materials, and particularly relates to a preparation method for a corncob-shaped HNT-PANI/PP.

Halloysite nanotube (HNT) is a new type of nanomaterial, generally having an outer diameter of 40-100 nm and a length of about 0.2 to 2 μm. HNT is a two-layer aluminosilicate which is formed by curling an inner-layer aluminum oxide octahedron and an outer-layer silica tetrahedral lattice in a misaligned manner. The HNT is cheap and readily available and has excellent thermal conductivity, name retardance and mechanical properties. At present, the research on HNT is a frontier and hot spot in the field of international materials, and HNT has unique structural characteristics and obvious resource advantages as compared with carbon nanotubes.

Polyaniline (PANI) is a synthetic polymer compound with special electrical properties. Its electrical properties are reflected in terms of pH, temperature, and doping during synthesis. Especially in a chemical oxidation synthesis process, when the pH is less than 2, the doping reaches 40%, and doping may increase the electrical conductivity by even a dozen orders of magnitude, close to the electrical conductivity of metal, and doping a polymer composite material with HNTs may significantly increase the electrical conductivity of the polymer.

With the advantages of low density, high cost performance, excellent processing performance and easy recycling, PP materials are one of the most widely used thermoplastics in the world. Like other polymer materials, the PP materials having low thermal conductivity and very high surface resistance are prone to static charge accumulation during use, which is an important potential hazard that may cause a fire and other safety accidents. Moreover, during the service process of PP engineering materials, with the increase of temperature, if heat is not transferred in time, the aging rate of PP materials will be accelerated, and their most basic mechanical properties will also be greatly reduced.

In the current domestic and international literatures, the anti-static treatment of PP materials is realized mainly through adding a large amount of carbon black, graphite and metal oxides, and the in-situ polymerization growth of nano conductive polymers on the HNTs has rarely been reported. Moreover, the addition of halloysite in PP materials can also improve the mechanical properties and thermal conductivity of composite materials. The present invention successfully provides a new way for preparing novel comprehensive PP nanocomposites, and has broad social and economic benefits and strategic value in practical applications.

SUMMARY OF THE INVENTION

Directed to disadvantages in the prior art, the present invention prepares an HNT-PANI/PP composite material by polymerizing PANI in situ on HNTs to prepare corncob-shaped HNT-PANI powder and then compositing the corncob-shaped HNT-PANI powder with PP. The material has excellent mechanical properties, anti-static property and thermal conductivity, and thus has broad social and economic benefits and strategic value.

To achieve the above objective, the present invention adopts the following technical solution:

A preparation method for a corncob-shaped HNT-PANI/PP, comprising: polymerizing aniline in situ on cleaned HNTs in an ice-water both; mixing corncob-shaped HNT-PANI composite powder obtained by vacuum drying and PP plastic in a high-speed mixer in a certain ratio, performing extrusion granulation by using a twin-screw extruder, and performing injection molding by using an injection molding machine to obtain standard sample strips of an HNT-PANI/PP composite material.

The preparation method for a corncob-shaped HNT-PANI/PP, comprising the following specific steps:

1) purifying halloysite by acid leaching, grinding and sieving, ultrasonically dispersing in deionized water, adding an aniline monomer and an ammonium persulfate initiator in a low-temperature reaction bath to have a low-temperature polymerization reaction for 24 hours, resting for 2 hours, washing with ionized water and absolute ethanol until colorless, and drying in a vacuum to obtain HNT-PANI powder; and 2) carrying out melt extrusion granulation on HNT-PANI powder together with PP and a compatibilizer polypropylene grafted maleic anhydride (PP-g-MAH) in a certain ratio in a co-rotating twin-screw extruder, Wherein the reaction temperatures of all sections of the twin-screw extruder are 180° C., 185° C., 190° C., 190° C., 195° C., 195° C., 195° C., 200° C., and 205° C., respectively, the die temperature is 200° C., and the main engine speed is 110 r/min; and finally, carrying out injection molding by using an injection molding machine to obtain standard strips of an HNT-PANI/PP composite material, wherein the barrel temperature of the injection molding machine is 200-205° C., and the pressure is maintained for 15 s.

The molar ratio of the HNTs to the aniline monomer in step 1) is 1:0.5-1:2.

The molar ratio of the aniline monomer to the ammonium persulfate in step 1) is 1:0.67.

The low-temperature polymerization reaction in step 1) is carried out at 4° C. or below.

The content of the PP-g-MAH in step 2) is 8 wt % of the PP.

In the obtained HNT-PANI/PP composite material, the content of the corncob-shaped HNT-PANI is 0-10 wt %.

The obtained HNT-PANI/PP composite material can be used for preparing instrument packaging and dustproof and flame-retardant engineering materials, and can be used in such fields as operating rooms, electronic component manufacturing workshops, and anti-static floors The present invention has the following significant advantages:

(1) According to the present invention, an aniline monomer is polymerized in situ on HNTs to form a corncob-shaped HNT-PANI nano composite material, which greatly improves the surface electrical conductivity of the HNTs; after being added in a PP matrix, the corncob-shaped HNT-PANI nano composite material works synergistically to not only improve the mechanical properties of PP, but also to greatly improve the electrical and thermal conductivity of PP, and broaden the application of PP in the anti-static field.

(2) The PP composite material prepared according to the present invention is safe and environmentally friendly, has excellent dustproof and anti-static properties and thermal conductivity, and is applicable to engineering devices in the anti-static field. Moreover, the present invention adapts to the needs of the current market, involves a scientific and reasonable preparation method and simple operation, greatly improves the added value of PP products, broadens the application scope of the PP products, and thus has a broad market prospect and significant social benefit.

DESCRIPTION OF THE PREFERRED EMBODIMENTS

Figure 1:
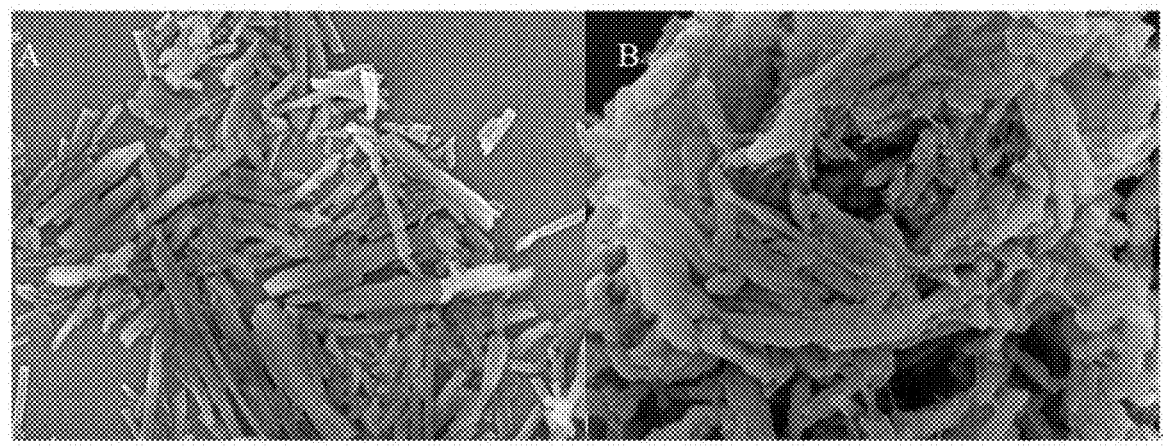
FIG. 1 shows SEM images of HNT and HNT-PANI, wherein A is a SEM image of HNTs and B is a SEM image of HNT-PANI.

A preparation method for a corncob-shaped HNT-PANI/PP, comprising the following specific steps:

1) purifying halloysite by acid leaching, grinding and sieving, ultrasonically dispersing in deionized water, adding an aniline monomer and an ammonium persulfate initiator in a low-temperature reaction bath to have a low-temperature polymerization reaction for 24 hours, resting for 2 hours, washing with ionized water and absolute ethanol until colorless, and drying in a vacuum to obtain dark green HNT-PANI powder, wherein the molar ratio of the HNTs to the aniline monomer is 1:0.5-1:2, and the molar ratio of the aniline monomer to the ammonium persulfate in the step is 1:0.67; and 2) carrying out melt extrusion granulation on the HNT-PANI powder composite material together with PP and a compatibilizer PP-g-MAH in a co-rotating twin-screw extruder, wherein reaction temperatures of all sections of the twin-screw extruder are 180° C., 185° C., 190° C., 190° C., 195° C., 195° C., 195° C., 200° C., and 205° C., respectively, the die temperature is 200° C., and the main engine speed is 110 r/min; and finally, carrying out injection molding by using an injection molding machine to obtain standard strips of an HNT-PANI/PP composite material, wherein the barrel temperature of the injection molding machine is 200-205° C., and the pressure is maintained for 15 s.

In order to make the content of the present invention more understandable, the technical solution of the present invention is further described below in conjunction with specific embodiments, but the present invention is not limited thereto.

Embodiment 1

1) Preparation of corncob-shaped HNT-PANI powder: purifying halloysite by acid leaching, grinding and sieving, and then drying in an oven; pouring 10 g of halloysite, 750 mL of 1 mol/L HC and 10 mL of a distilled aniline monomer into a 1500 mL round-bottom flask, ultrasonically dispersing for 1 h at 100 W, and then magnetically stirring for 0.5 h in an ice water bath; adding 15.6 g of ammonium persulfate to 250 mL of HCl and stirring until the ammonium persulfate is completely dissolved, cooling the ammonium persulfate solution in an ice bath for 5 min and then pouring into a separating funnel; and adding dropwise all the ammonium persulfate solution within 0.5-1.0 h at a controlled adding rate, reacting for 24 h, resting for 2 h, washing and filtering with deionized water and absolute ethanol several times until filtrate is transparent and colorless, and then drying the filtrate in a vacuum drying oven to obtain a dark green HNT-PANI nanopowder;

2) HNT-PANI/PP composite material: mixing 5 g of the nanopowder prepared in step 1), 39.6 g of PP-g-MAH and 455.4 g of PP in a high-speed mixer for 5 min, and then carrying out melt extrusion granulation in a co-rotating twin-screw extruder, and finally carrying out injection molding by using an injection molding machine to eventually obtain standard sample strips of a PP composite material containing 1 wt % HNT-PANI.

Embodiment 2

In step 2), 10 g of HNT-PANI nanopowder, 39.2 g of PP-g-MAH and 450.8 g of PP are added, and other conditions are the same as in Embodiment 1, and thus 2 wt % HNT-PANI/PP composite material is finally obtained.

Embodiment 3

In step 2), 15 g of HNT-PANI nanopowder, 38.8 g of PP-g-MAH and 446.2 g of PP are added, and other conditions are the same as in Embodiment 1, and thus 3 wt % HNT-PANI/PP composite material is finally obtained.

Embodiment 4

In step 2), 20 g of HNT-PANI nanopowder, 38.4 g of PP-g-MAH and 441.6 g of PP are added, and other conditions are the same as in Embodiment 1, and thus 4 wt % HNT-PANI/PP composite material is finally obtained.

Embodiment 5

In step 2), 25 g of HNT-PANI nanopowder, 38 g of PP-g-MAH and 437 g of PP are added, and other conditions are the same as in Embodiment 1, and thus 5 wt % HNT-PANI/PP composite material is finally obtained.

Embodiment 6

In step 2), 40 g of HNT-PANI nanopowder, 36.8 g of PP-g-MAH and 423.2 g of PP are added, and other conditions are the same as in Embodiment 1, and thus 8 wt % HNT-PANI/PP composite material is finally obtained.

Reference Example 1

In step 2), 40 g of PP-g-MAH and 460 g of PP are added, and other condition parameters are the same as in Embodiment 1, and thus 0 wt % HNT-PANI/PP composite material is finally obtained.

FIG. 1 shows SEM images of HNT (A) and HNT-PANI (B). As can be seen from the figure, PANI is attached to the HNT, exactly like a corncob-shaped structure, and PANI is successfully loaded on the surface of the HNT.

Figure 2:
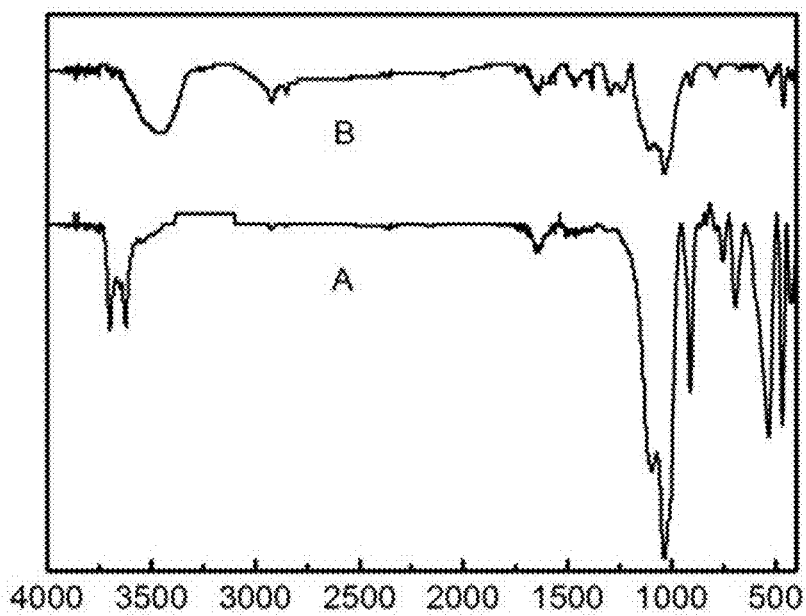
FIG. 2 shows infrared spectrum charts of HNT and HNT-PANI, wherein A is an infrared spectrum chart of HNT and B is an infrared spectrum chart of HNT-PANI.

FIG. 2 shows infrared spectrum charts of HNT (A) and HNT-PANI (B). It can be seen from the figure that HNT-PANI exhibits a PANI Quinone characteristic peak at 1570 $cm^{-1}$ and a characteristic absorption peak of C=C on the loaded PANI appears at 1485 $cm^{-1}$.

Figure 3:
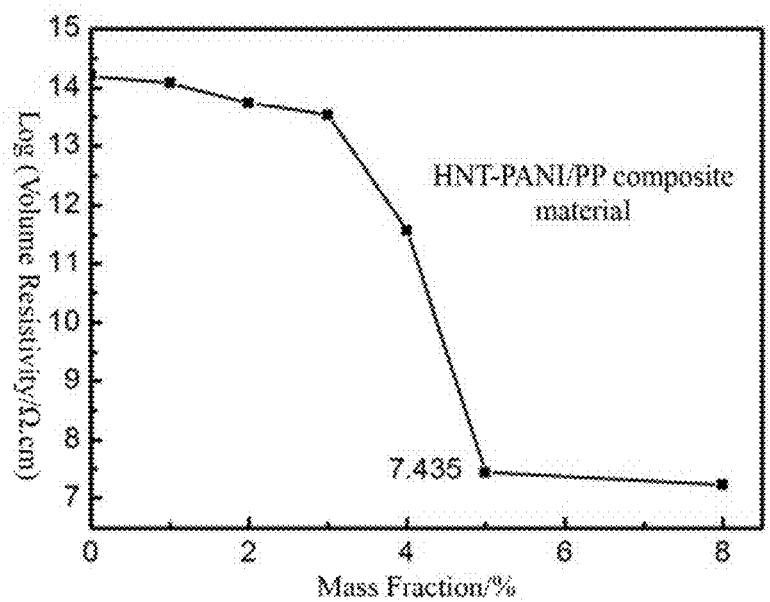
FIG. 3 is a graph showing the change in volume resistivity of HNT-PANI/PP composite materials with different mass fractions.

FIG. 3 is a graph showing the change in volume resistivity ($\rho v$) of HNT-PANI/PP composite materials with different mass fractions. From FIG. 3, it can be concluded that when the content of the HNT-PANI is not more than 4%, the ρv of the composite materials decreases a little with the increase of the mass fraction of the HNT-PANI composite materials. When their mass fractions reach 4%, the Log(ρv) of the composite materials suddenly drops to 7.435, 7 orders of magnitude lower than that of a pure PP material (14.204); when the mass fraction of the HNT-PANI composite materials further increases, the ρv of the composite materials does not change significantly, it can be inferred that the conductivity percolation values of the composite materials are between 4% and 5%, and in this case, a continuous conductive path or network has been basically formed in the composite system, and the formed composite material has good electrical conductivity, and the PP composite material meets the anti-static and dustproof requirements.

Figure 4:
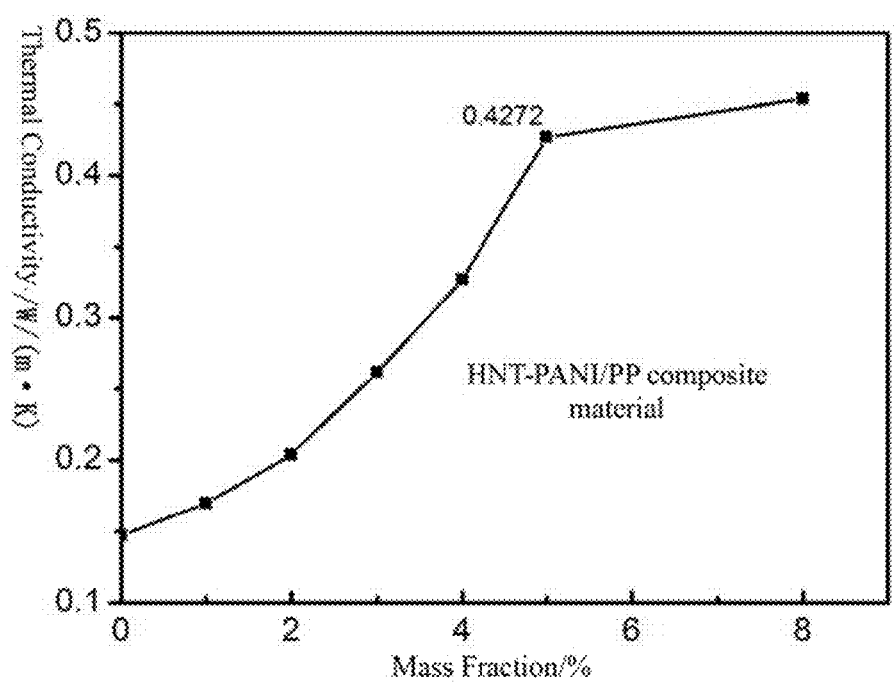
FIG. 4 is a graph showing the change in thermal conductivity of HNT-PANI/PP composite materials with different mass fractions.

FIG. 4 is a graph showing the change in thermal conductivity of HNT-PANI/PP composite materials with different mass fractions. It can be seen from FIG. 4 that when the content of the HNT-PANI is 4 wt %-5 wt %, the thermal conductivity of the composite materials increases rapidly and a thermal conductivity network is basically formed. When the mass fraction of the HNT-PANI is 5 wt %, the thermal conductivity of the composite film is 0.4272 W/(m·K), 2.906 times higher than that of pure PP [0.1470 W/(m·K)], indicating that the thermal conductivity of the composite material is greatly improved; thus, the application of the PP material in heat conduction is broadened.

Table I shows mechanical properties of HNT-PANI/PP composite materials with different mass fractions.

| HNT-PANI mass fraction/% | Tensile strength/MPa | Impact strength/ (KJ/m$^2$) | Bending strength/MPa |
|---|---|---|---|
| 0 | 29.6 | 3.3 | 31.2 |
| 1 | 32.4 | 3.5 | 35.4 |
| 2 | 36.4 | 3.7 | 37.9 |
| 3 | 37.9 | 3.9 | 40.1 |
| 4 | 38.2 | 4.0 | 41.7 |
| 5 | 38.7 | 4.2 | 42.3 |
| 8 | 35.3 | 3.8 | 41.4 |

The composite material provided by the present invention is safe and environmentally friendly, and is particularly applicable to the field of preparation of anti-static engineering materials, such as the fields of operating rooms, electronic component manufacturing workshops, and anti-static floors which have relatively high requirements for the anti-static property and thermal conductivity. Moreover, the present invention adapts to the needs of the current market, involves a scientific and reasonable preparation method and simple operation, greatly improves the added value of PP products, broadens the application scope of PP products, and thus has a very broad market prospect and social and economic benefits.

The above description is only the preferred embodiments of the present invention, and all equivalent changes and modifications made within the scope of the patent application of the present invention should fall within the scope of the present invention.

What is claimed is:

1. A preparation method for a corncob-shaped halloysite nanotube-polyaniline (HNT-PANI)/polypropylene (PP), comprising:
    polymerizing aniline in situ on cleaned halloysite nanotubes (HNTs) in an ice-water bath to produce a corncob-shaped HNT-PANI composite powder;
    vacuum drying the corncob-shaped HNT-PANI composite powder;
    mixing the corncob-shaped HNT-PANI composite powder and PP plastic in a high-speed mixer to produce a corncob-shaped HNT-PANI/PP mixture;
    performing extrusion granulation of the corncob-shaped HNT-PANI/PP mixture by using a twin-screw extruder to produce corncob-shaped HNT-PANI/PP granules; and
    performing injection molding of the corncob-shaped HNT-PANI/PP granules by using an injection molding machine to obtain a corncob-shaped HNT-PANI/PP composite material.

2. The preparation method for a corncob-shaped HNT-PANI/PP according to claim 1, wherein
    in the corncob-shaped HNT-PANI/PP composite material, the content of the corncob-shaped HNT-PANI powder is 1-10% of the mass of the composite material.

3. The preparation method for a corncob-shaped HNT-PANI/PP according to claim 1, further comprising:
    prior to the step of polymerizing aniline in situ on cleaned HNTs, purifying halloysite by acid leaching to obtain cleaned halloysite, then subjecting the cleaned halloysite to grinding and sieving to obtain the cleaned HNTs;
    wherein the polymerizing aniline in situ on cleaned halloysite nanotubes (HNTs) in an ice-water bath to produce a corncob-shaped HNT-PANI composite powder comprises: ultrasonically dispersing the cleaned HNTs in deionized water to obtain a cleaned HNTs solution, then adding an aniline monomer and an ammonium persulfate initiator into the cleaned HNTs solution in reaction the ice-water bath to have a low-temperature polymerization reaction for 24 hours to polymerize aniline in situ on the cleaned HNTs, resting for 2 hours, washing with ionized water and absolute ethanol until colorless to obtain the corncob-shaped HNT-PANI composite powder;
    wherein the mixing of corncob-shaped HNT-PANI composite powder and PP plastic further comprise mixing a compatibilizer polypropylene grafted maleic anhydride (PP-g-MAH);
    wherein the twin-screw extruder is a co-rotating twin-screw extruder, and wherein the extrusion granulation is done in the melt wherein the reaction temperatures of all sections of the co-rotating twin-screw extruder are 180° C., 185° C., 190° C., 190° C., 195° C., 195° C., 195° C., 200° C., and 205° C., respectively, the die temperature is 200° C., and the main engine speed is 110 r/min; and
    wherein the barrel temperature of the injection molding machine is 200-205° C., and the pressure is maintained for 15 s.

4. The preparation method for a corncob-shaped HNT-PANI/PP according to claim 3, wherein
    the molar ratio of the cleaned HNTs to the aniline monomer is 1:0.5-1:2.

5. The preparation method for a corncob-shaped HNT-PANI/PP according to claim 3, wherein
    the molar ratio of the aniline monomer to the ammonium persulfate is 1:0.67.

6. The preparation method for a corncob-shaped HNT-PANI/PP according to claim 3, wherein
    the low-temperature polymerization reaction is carried out at 4° C. or below.

7. The preparation method for a corncob-shaped HNT-PANI/PP according to claim 3, wherein
    the content of the PP-g-MAH is 8% of the mass of the PP.

* * * * *